United States Patent [19]

Tsutsui et al.

[11] Patent Number: 4,704,491

[45] Date of Patent: Nov. 3, 1987

[54] LIQUID ETHYLENE-ALPHA-OLEFIN RANDOM COPOLYMER, PROCESS FOR PRODUCTION THEREOF, AND USE THEREOF

[75] Inventors: Toshiyuki Tsutsui, Ohtake; Mamoru Kioka, Iwakuni; Akinori Toyota, Iwakuni; Norio Kashiwa, Iwakuni, all of Japan

[73] Assignee: Mitsui Petrochemical Industries, Ltd., Tokyo, Japan

[21] Appl. No.: 843,556

[22] Filed: Mar. 25, 1986

[30] Foreign Application Priority Data

Mar. 26, 1985 [JP] Japan .................. 60-59645
Nov. 21, 1985 [JP] Japan .................. 60-259835

[51] Int. Cl.$^4$ ........................... C10L 107/00
[52] U.S. Cl. ........................... 585/10; 585/12; 585/18; 585/512; 585/522; 585/523; 585/524
[58] Field of Search ............. 585/10, 12, 18, 512, 585/522, 523, 524

[56] References Cited

U.S. PATENT DOCUMENTS

| | | | |
|---|---|---|---|
| 3,598,552 | 8/1971 | Cohen et al. | 585/12 |
| 3,660,057 | 5/1972 | Ilnyckji | 585/10 |
| 3,672,852 | 6/1972 | Vermillion et al. | 585/10 |
| 3,679,380 | 7/1972 | Biswell et al. | 585/12 |
| 4,507,515 | 3/1985 | Johnston et al. | 585/12 |

FOREIGN PATENT DOCUMENTS 0069951  7/1981  Euorpean Pat. Off. ........... 585/512

Primary Examiner—Asok Pal
Attorney, Agent, or Firm—Sherman and Shalloway

[57] ABSTRACT

A liquid ethylene-alpha-olefin random copolymer, characterized in that
(a) it has an ethylene unit content of 10 to 85 mole % and an alpha-olefin unit content of 15 to 90 mole %,
(b) it has a low molecular weight,
(c) it has a narrow molecular weight distribution,
(d) the dispersion of the ethylene units and alpha-olefin units in the polymer chain is in the advanced state, and
(e) the directions of bonding of the alpha-olefin units in the polymer chain are nearly the same.

The copolymer is prepared by copolymerizing ethylene and an alpha-olefin having 3 to 20 carbon atoms in the presence of a catalyst comprising a compound of a transition metal of Group IVb of the periodic table and an aluminoxane. The copolymer is very useful as a synthetic lubricant oil.

11 Claims, No Drawings

LIQUID ETHYLENE-ALPHA-OLEFIN RANDOM COPOLYMER, PROCESS FOR PRODUCTION THEREOF, AND USE THEREOF

This invention relates to a liquid ethylene-alpha-olefin random copolymer, a process for its production and its use as a synthetic lubricant oil. More specifically, it relates to a liquid ethylene-type random copolymer having a narrow molecular weight distribution and a narrow composition distribution, a process for its production and its use as a lubricant oil.

It should be understood that the term "liquid ethylene-alpha-olefin random copolymer", as used in the present specification and claims, also denotes a waxy ethylene-alpha-olefin random copolymer.

Liquid ethylene/alpha-olefin copolymers, typically liquid ethylene/propylene copolymer, have been expected to find applications as synthetic lubricant oils or various resin modifiers. They are known to be produced by methods comprising copolymerizing ethylene with alpha-olefins in the presence of titanium-type catalysts composed of titanium compounds and organoaluminum compounds or vanadium-type compounds composed of vanadium compounds and organoaluminum compounds. Liquid ethylene/alpha-olefin copolymers produced in the presence of the titanium-type catalysts generally have poor randomness, broad molecular weight and composition distributions, and poor properties for use as synthetic lubricant oils. Liquid ethylene/alpha-olefin copolymers obtained in the presence of the vanadium-type catalysts have higher randomness, narrower molecular weight and composition distributions than the copolymers obtained with the titanium-type catalysts, and therefore have fairly improved properties for use as synthetic lubricant oils. It is still desired however to improve the quality of such copolymers for applications which must meet rigorous requirements.

Ethylene/alpha-olefin copolymers obtained with the vanadium-type catalysts are proposed, for example, in Japanese Patent Publications Nos. 21650/1972 and 42723/1972, and Japanese Laid-Open Patent Publications Nos. 117585/1982, 112809/1976, 65205/1973 and 35009/1985. Japanese Patent Publication No. 21650/1972 and Japanese Laid-Open Patent Publication No. 117585/1982 both describe the utilization of liquid ethylene/alpha-olefin copolymers in synthetic lubricant oils. These copolymers, however, have the unsatisfactory properties mentioned above. Japanese Laid-Open Patent Publication No. 112809/1976 discloses a viscosity index improver composed of an ethylene/propylene copolymer having a weight average molecular weight ($\overline{M}_w$)/number average molecular weight ($\overline{M}_n$) ratio of not more than 2.5 and an intrinsic viscosity of 0.4 to 1.5. However, the ethylene/propylene copolymers specifically described in the referential examples and working examples of this patent document are solid. Japanese Patent Publication No. 42723/1972 and Japanese Laid-Open Patent Publication No. 65205/1973 describes lubricant oil compositions comprising lubricant oils and solid ethylene/alpha-olefin copolymers having a crystallinity of 3 to 18% and a $\overline{M}_w/\overline{M}_n$ of not more than 4.

However, these solid ethylene/alpha-olefin copolymers cannot be used alone as synthetic lubricant oils. Japanese Laid-Open Patent Publication No. 35009/1985 discloses ethylene/alpha-olefin copolymers having a $\overline{M}_w/\overline{M}_n$ of less than 2 and a weight average molecular weight of about 2,000 to about 12,000,000, preferably about 10,000 to about 1,000,000, and a lubricant oil composition comprising a lubricant oil base and such an ethylene/alpha-olefin copolymer. However, the ethylene/alpha-olefin copolymers specifically described in this patent document are high-molecular-weight solid copolymers. These solid ethylene/alpha-olefin copolymers, as stated above, cannot be used alone as synthetic lubricant oils.

Catalysts comprising zirconium compounds and aluminoxanes are disclosed in a series of prior art publications as new Ziegler-type olefin polymerization catalysts. But these publications fail to give any description which suggests liquid ethylene/alpha-olefin copolymers.

Japanese Laid-Open Patent Publication No. 19309/1983 describes a process which comprises polymerizing ethylene and at least one alpha-olefin having 3 to 12 carbon atoms at a temperature of −50° C. to 200° C. in the presence of a catalyst comprising a transition metal-containing compound represented by the following formula

(cyclopentadienyl)$_2$MeR$^1$Hal wherein R$^1$ is cyclopentadienyl, C$_1$–C$_6$ alkyl or halogen,
Me is a transition metal, and Hal is halogen,
and a linear aluminoxane represented by the following formula

Al$_2$OR$_4{}^2$(Al(R$^2$)—O)$_n$ wherein R$^2$ is methyl or ethyl and n is a number of 4 to 20,
or a cyclic aluminoxane represented by the following formula

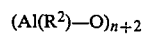

(Al(R$^2$)—O)$_{n+2}$ wherein R$^2$ and n are as defined.

This patent document states that to control the density of the resulting polyethylene, ethylene should be polymerized in the presence of a small amount (up to 10% by weight) of an alpha-olefin having a somewhat long chain or a mixture of such alpha-olefins.

Japanese Laid-Open Patent Publication No. 95292/1984 describes a process for producing a linear aluminoxane represented by the formula

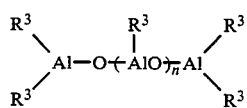

wherein n is 2 to 40 and R$^3$ is a C$_1$–C$_6$ alkyl,
and cyclic aluminoxanes of the formula

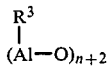

wherein n and $R^3$ are as defined.

The patent document states that if ethylene is polymerized in the presence of a mixture of methylaminoxane produced by the process described in it with a bis(cyclopentadienyl) compound of titanium or zirconium, polyethylene is obtained in an amount of at least 25 million grams/hour gram of transition metal.

Japanese Laid-Open Patent Publication No. 35005/1985 discloses a process for producing an olefin polymerization catalyst which comprises reacting an aluminoxane compound represented by the following formula

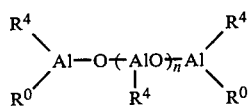

wherein $R^4$ is $C_1$-$C_{10}$ alkyl, $R^o$ is $R^4$ or $R^4$ and $R^o$ together represent —O—,
with a magnesium compound, chlorinating the reaction product, and further treating the chlorination product with a compound of Ti, V, Zr or Cr. The patent document states that the resulting catalyst is suitable for copolymerizing a mixture of ethylene and a $C_3$-$C_{12}$ alpha-olefin.

Japanese Laid-Open Patent Publication No. 35,006/1985 discloses a combination of (a) a mono-, di- or tri-cyclopentadienyl of two or more different transition metals or a derivative thereof and (b) alumoxane (aluminoxane) as a catalyst for producing a blended polymer in a reactor. Example 1 of this patent document discloses that polyethylene having a number average molecular weight of 15,300, a weight average molecular weight of 36,400 and a propylene content of 3.4% was obtained by polymerizing ethylene and propylene using bis(pentamethylcyclopentadienyl)zirconium dimethyl and alumoxane as a catalyst. Example 2 of this patent document states that a blend of polyethylene and ethylene/propylene copolymer which has a number average molecular weight of 2,000, a weight average molecular weight of 8,300 and a propylene content of 7.1 mole% and consists of a toluene-soluble portion having a number average molecular weight of 2,200, a weight average molecular weight of 11,900 and a propylene content of 30 mole% and a toluene-insoluble portion having a number average molecular weight of 3,000, a weight average molecular weight of 7,400 and a propylene content of 4.8 mole% was obtained by polymerizing ethylene and propylene using bis(pentamethylcyclopentadienyl)zirconium dichloride, bis(methylcyclopentadienyl)zirconium dichloride and alumoxane. Likewise, Example 3 describes a blend of LLDPE and an ethylene/propylene copolymer which consists of a soluble portion having a molecular weight distribution ($\overline{M}_w/\overline{M}_n$) of 4.57 and a propylene content of 20.6 mole% and an insoluble portion having a molecular weight distribution of 3.04 and a propylene content of 2.9 mole%.

Japanese Laid-Open Patent Publication No. 35007/1985 discloses a process which comprises polymerizing ethylene alone or with an alpha-olefin having at least 3 carbon atoms in the presence of a catalyst comprising a metallocene and a cyclic alumoxane of the following formula

wherein $R^5$ is an alkyl group having 1 to 5 carbon atoms, and n is an integer of 1 to 20, or a linear alumoxane of the following formula

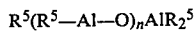

wherein $R^5$ and n are as defined.

The polymer obtained by this process has a weight average molecular weight of about 500 to about 1,400,000 and a molecular weight distribution of 1.5 to 4.0 as described in this patent document.

Japanese Laid-Open Patent Publication No. 35008/1985 describes that by using a catalyst system comprising an alumoxane and at least two metallocenes, polyethylene or a copolymer of ethylene and a $C_3$-$C_{10}$ alpha-olefin having a broad molecular weight distribution is produced. This patent document states that the above copolymer has a molecular weight distribution of 2 to 50.

It is an object of this invention to provide a novel liquid ethylene-alpha-olefin random copolymer.

Another object of this invention is to provide a liquid ethylene-alpha-olefin random copolymer having a narrow molecular weight distribution and a narrow composition distribution.

Still another object of this invention is to provide a liquid ethylene-alpha-olefin random copolymer having a high viscosity index, a high ignition point and a low pour point.

Yet another object of this invention is to provide a liquid ethylene-alpha-olefin random copolymer having excellent shear stability, oxidation stability and thermal stability and giving excellent oil film strength.

A further object of this invention is to provide a synthetic lubricant oil composed of the aforesaid liquid ethylene-alpha-olefin random copolymer having excellent lubricant oil properties.

A still further object of this invention is to provide a liquid ethylene-alpha-olefin random copolymer which is also useful as a lubricant oil additive, a fuel oil additive or a modifier for polyolefins and rubbery polymers.

A yet further object of this invention is to provide a liquid ethylene-alpha-olefin random copolymer which has a double bond capable of reacting with maleic anhydride, etc. at the molecular chain ends and therefore permits easy modification according to various purposes.

Additional object of this invention is to provide a process for producing the aforesaid ethylene-alpha-olefin random copolymer.

Other objects of this invention along with its advantages will become apparent from the following description.

These objects and advantages of this invention are achieved in accordance with this invention by a liquid ethylene-alpha-olefin random copolymer consisting essentially of units derived from ethylene and an alpha-olefin having 3 to 20 carbon atoms, said copolymer being characterized in that (a) it has an ethylene unit content in the range of 10 to 85 mole% and an alpha-olefin unit content in the range of 15 to 90 mole%, (b) it has a number average molecular weight ($\overline{M}_n$), measured by gel permeation chromatography, of $3 \times 10^2$ to $1 \times 10^4$, (c) it has a molecular weight distribution ($\overline{M}_w/\overline{M}_n$), determined by gel permeation chromatography, of not more than 2.5, (d) it has a B value, defined by the following equation (I), within the range defined by the following equation (II)

$$B = \frac{P_{OE}}{2P_O \cdot P_E} \quad (I)$$

wherein $P_E$ represents the molar fraction of the ethylene component in the copolymer, $P_O$ is the molar fraction of the alpha-olefin component in the copolymer, $P_{OE}$ is the molar fraction of alpha-olefin/ethylene chains in the total dyad chains, $$1.05 \leq B \leq 2 \quad (II),$$

(e) signals of $\alpha\beta$ and $\beta\gamma$ based on a methylene chain between two adjacent tertiary carbon atoms in the main chain of the copolymer are not substantially observed in the $^{13}$C-NMR spectum of the copolymer, and (f) it has an iodine value in the range of 0 to 85.

According to this invention, the liquid ethylene-alpha-olefin random copolymer of the invention can be produced in accordance with this invention by a process which comprises copolymerizing ethylene and an alpha-olefin having 3 to 20 carbon atoms in the presence of a catalyst comprising (A) a compound of a transition metal of Group IVb of the periodic table, and (B) an aluminoxane.

The compound (A) of a transition metal of Group IVb of the periodic table may, for example, be a compound of titanium (Ti), zirconium (Zr) or hafnium (Hf). Of these, Ti and Zr compounds are preferred, and the Zr compounds are most preferred.

These compounds are, for example, represented by the following formula (III)

wherein a, b, c and d are positive numbers and $a+b+c+d=4$, $R^{11}$ represents an alkyl, alkenyl, cycloalkadienyl, aryl or aralkyl group, $R^{12}$ is the same as $R^{11}$ or represents a halogen atom, $R^{13}$ and $R^{14}$ are identical or different and each is the same as $R^{12}$ or represents a hydrogen atom, and Me is Ti, Zr or Hf.

Example of the alkyl group in formula (III) include methyl, ethyl, n-propyl, isopropyl, n-butyl, sec-butyl, tert-butyl, isobutyl and neopentyl groups.

Examples of the alkenyl group include isopropenyl and 1-butenyl groups.

Examples of the cycloalkadienyl group include cyclopentadienyl, methylcyclopentadienyl, ethylcyclopentadienyl, dimethylcyclopentadienyl, indenyl and tetrahydroindenyl groups.

Examples of the aryl group include phenyl and tolyl groups. Examples of the aralkyl group include benzyl and neophyl groups.

Example of the halogen atom are fluorine, chlorine and bromine atoms.

The compounds of formula (III) may, for example, be compounds of the following formula (III)-1

wherein e, f, g and h are positive numbers, and $e+f+g+h=4$, $R^{15}$ represents a cycloalkadienyl group, and $R^{16}$ and $R^{17}$ are identical or different and each represents a cycloalkadienyl, aryl, aralkyl or alkyl group or a halogen or hydrogen atom.

Specific examples of the compounds of formula (III) including formula (III)-1 include titanium compounds such as
bis(cyclopentadienyl)dimethyltitanium,
bis(cyclopentadienyl)diethyltitanium,
bis(cyclopentadienyl)diisopropyltitanium,
bis(cyclopentadienyl)dimethyltitanium,
bis(cyclopentadienyl)methyltitanium monochloride,
bis(cyclopentadienyl)ethyltitanium monochloride,
bis(cyclopentadienyl)isopropyltitanium monochloride,
bis(cyclopentadienyl)methyltitanium monobromide,
bis(cyclopentadienyl)methyltitanium monoiodate,
bis(cyclopentadienyl)titanium difluoride,
bis(cyclopentadienyl)titanium dichloride,
bis(cyclopentadienyl)titanium dibromide, and
bis(cyclopentadienyl)titanium diiodate;

zirconium compounds such as
bis(cyclopentadienyl)dimethylzirconium,
bis(cyclopentadienyl)diethylzirconium,
bis(methylcyclopentadienyl)diisopropylzirconium,
bis(cyclopentadienyl)methylzirconium monochloride,
bis(cyclopentadienyl)ethylzirconium monochloride,
bis(cyclopentadienyl)methylzirconium monobromide,
bis(cyclopentadienyl)methylzirconium monoiodate,
bis(cyclopentadienyl)zirconium difluoride,
bis(cyclopentadienyl)zirconium dichloride,
bis(cyclopentadienyl)zirconium dibromide,
bis(cyclopentadienyl)zirconium diiodate,
bis(cyclopentadienyl)zirconium monochloride monohydride,
bis(cyclopentadienyl)zirconium monobromide monohydride,
bis(cyclopentadienyl)methylzirconium hydride,
bis(cyclopentadienyl)ethylzirconium hydride,
bis(cyclopentadienyl)cyclohexylzirconium hydride,
bis(cyclopentadienyl)phenylzirconium hydride,
bis(cyclopentadienyl)benzylzirconium hydride,
bis(cyclopentadienyl)neopentylzirconium hydride,
bis(methylcyclopentadienyl)zirconium monochloride monohydride, and
bisindenyl zirconium monochloride monohydride; and hafnium compounds such as bis(cyclopentadienyl)dimethylhafnium, bis(cyclopentadienyl)methylhafnium monochloride, and bis(cyclopentadienyl)hafnium dichloride.

The transition metal compound may be used directly. Preferably, those transition metal compounds which are difficultly soluble in solvents such as toluene (for example, bis(cyclopentadienyl)zirconium monochloride monohydride) are used after they are contacted with organoaluminum compounds. This operation renders the sparingly solvent-soluble transition metal compounds readily soluble in solvents.

Specific example of the organoaluminum compounds to be contacted with the transition metal compounds include trialkyl aluminums such as trimethyl aluminum, triethyl aluminum and tributyl aluminum; trialkenyl aluminums such as triisoprenyl aluminum, dialkyl aluminum alkoxides such as dimethyl aluminum methoxide, diethyl aluminum ethoxide and dibutyl aluminum butoxide; alkyl aluminum sesquialkoxides such as methyl aluminum sesquimethoxide and ethyl aluminum sesquiethoxide; partially alkoxylated alkyl aluminums having the average composition of the formula $R_{2.5}^{18}Al(OR^{19})_{0.5}$ (wherein $R^{18}$ represents an alkyl group or a halogen atom, and $R^{19}$ represents an alkyl group); and partially halogenated alkyl aluminums, for example dialkyl aluminum halides such as dimethyl aluminum chloride, diethyl aluminum chloride and dimethyl aluminum bromide, alkyl aluminum sesquihalides such as methyl aluminum sesquichloride and ethyl aluminum sesquichloride, and alkyl aluminum dihalides such as methyl aluminum dichloride and ethyl aluminum dichloride.

Preferably, the reaction of the two compounds is carried out in a hydrocarbon solvent while shutting off light. The mole ratio of the organoaluminum compound and the zirconium compound (Al/Zr) is preferably from 0.5 to 30, more preferably from 1 to 20. The concentration of zirconium is preferably 0.001 to 1 mole, more preferably about 0.005 to 0.1 mole, per liter of the liquid phase. The reaction temperature is preferably 0° to 120° C., more preferably about 20° to 100° C.

Specific examples of the aluminoxane (B) as an ingredient constituting the catalyst used in this invention are organoaluminum compounds represented by the following general formula (IV) or (V)

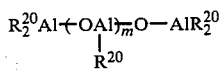  (IV)

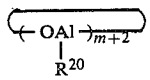 (V)

wherein $R^{20}$ represents an alkyl group, and m is preferably more than 20, especially preferably more than 25. In these aluminoxanes, $R^{20}$ is an alkyl group such as methyl, ethyl, propyl or butyl group, preferably the methyl and ethyl groups, especially preferably the methyl group. m is preferably more than 20, especially preferably at least 25, especially preferably 30 to 100.

The aluminoxanes may be prepared, for example, by the following methods.

(1) A method which comprises adding a trialkyl aluminum in a suspension of a compound containing water of adsorption or a salt containing water or crystallization, for example, magnesium chloride hydrate, copper sulfate hydrate or aluminum sulfate hydrate, in a hydrocarbon medium, and reacting the compounds.

(2) A method which comprises reacting a trialkyl aluminum directly with water in a medium such as benzene, toluene, ethyl ether or tetrahydrofuran.

The method (1) is preferred. The aluminoxanes used in this invention may permissibly contain small amounts of organometallic components.

In the process of this invention, the starting material to be fed to the polymerization reaction system is a mixture of ethylene and an alpha-olefin having 3 to 20 carbon atoms. The content of ethylene in the starting material is usually 2 to 60 mole%, preferably 4 to 55 mole%, and the content of the alpha-olefin is usually 40 to 98 mole%, preferably 45 to 96 mole%.

Specific examples of the alpha-olefin having 3 to 20 carbon atoms used in the starting material in the process of this invention are propylene, 1-butene, 1-hexene, 4-methyl-1-pentene, 1-octene, 1-decene, 1-dodecene, 1-tetradecene, 1-hexadecene, 1-octadecene and 1-eicocene.

The polymerization reaction of the olefins in the process of this invention is usually carried out in a hydrocarbon solvent. Examples of the hydrocarbon solvent used for this purpose are aliphatic hydrocarbons such as butane, isobutane, pentane, hexane, octane, decane, dodecane, hexadecene and octadecane; alicyclic hydrocarbons such as cyclopentane, methylcylopentane, cyclohexane and cyclooctane; aromatic hydrocarbons such as benzene, toluene and xylene; and petroleum fractions such as gasoline, kerosene and light oils. The starting olefins may themselves serve as the hydrocarbon medium. Among these hydrocarbon media, the aromatic hydrocarbons and the starting olefins are preferably used in the process of this invention.

The polymerization temperature in the process of this invention is, for example, −50° to 200° C., preferably −30° to 100° C., especially preferably −20° to 80° C.

The proportion of the transition metal compound (A) used in practicing the process of this invention is, for example, $10^{-8}$ to $10^{-2}$ gram-atom/liter, preferably $10^{-7}$ to $10^{-3}$ gram-atom/liter, as the concentration of the transition metal in the polymerization reaction system. The proportion of the aluminoxane (B) used is, for example, $10^{-4}$ to $10^{-1}$ gram-atom/liter, preferably $10^{-3}$ to $5 \times 10^{-2}$ gram-atom, as the concentration of the aluminum atom in the polymerization reaction system. The ratio of the aluminum atom to the transition metal in the polymerization reaction system is, for example, in the range of 25 to $10^7$, preferably $10^2$ to $10^6$. The molecular weight of the copolymer can be controlled by using hydrogen, and/or by adjusting the polymerization temperature.

When the copolymerization reaction in the process of this invention is carried out in the absence of hydrogen, a liquid ethylene-type random copolymer having a high iodine value can be obtained. When it is carried out in the presence of hydrogen, a liquid ethylene-type random copolymer having a low iodine value or an iodine value of substantially zero can be obtained.

After the polymerization reaction by the process of this invention, the polymerization reaction mixture is worked up in a customary manner to give the liquid ethylene-type random copolymer of the invention.

When the liquid ethylene-type random copolymer having a high iodine value obtained by the aforesaid process is hydrogenated in the presence of a hydrogenating catalyst, a liquid ethylene-type random copolymer having a lower iodine value or an iodine value of substantially zero can be obtained. Examples of the hydrogenating catalyst that can be used are metals of Group VIII of the periodic table such as iron, cobalt, nickel, rhodium, palladium and platinum. Of these, nickel is preferred. Raney nickel is especially preferred. The hydrogenation reaction may be carried out in the presence or absence of solvent. Examples of the solvent are hydrocarbons such as pentane, hexane, heptane, octane, decane cyclohexane, methylcyclohexane and cyclooctane. The temperature in the hydrogenation reaction is, for example, 50° to 250° C., preferably 100° to 200° C. The hydrogenation reaction pressure is, for example, in the range of 5 to 100 kg/cm$^2$-G.

The liquid ethylene-type random copolymer is substantially transparent at 25° C.

The liquid ethylene-type random copolymer of this invention has an ethylene unit content of 10 to 85 mole%, preferably 20 to 80 mole%, especially preferably 30 to 70 mole%, and an alpha-olefin unit content of 15 to 90 mole%, preferably 20 to 80 mole%, especially preferably 30 to 70 mole%.

The liquid ethylene-type random copolymer of this invention has a molecular weight distribution ($\overline{M}_w/\overline{M}_n$), measured by gel permeation chromatography (GPC), of not more than 2.5, preferably not more than 2.2, especially preferably not more than 2. If the molecular weight distribution of the liquid ethylene-type copolymer is greater than 2.5, the liquid ethylene-type polymer has a lower ignition point and a higher pour point if its molecular weight remains the same.

The molecular weight distribution is measured as follows in accordance with Takeuchi, "Gel Permeation Chromatography" published by Maruzen Co., Ltd., Tokyo.

(1) The GPC count of standard polystyrene (monodisperse polystyrene made by Toyo Soda Co., Ltd.) of known molecular weight M is measured, and a calibration curve for the molecular weight M versus the elution volume is drawn. The concentration of standard polystyrene at this time is adjusted to 0.02% by weight.

(2) A gel permeation chromatograph of a sample polymer is taken by GPC measurement. From the calibration curve mentioned in (1) above, the number average molecular weight $\overline{M}_n$ and the weight average molecular weight $\overline{M}_w$ of the sample are calculated. The $\overline{M}_w/\overline{M}_n$ is thus obtained. The conditions for sample preparation and GPC measurement are as follows:

Sample preparation (a) The sample is put in an Erlenmeyer flask together with o-dichlorobenzene as a solvent so that its concentration becomes 0.1% by weight.

(b) An antioxidant (2,6-di-tert-butyl-p-cresol) is added in an amount of 0.05% by weight based on the polymer solution in the Erlenmeyer flask containing the sample.

(c) The Erlenmeyer flask is heated to 140° C., and the mixture is stirred for about 30 minutes to form a solution.

(d) The polymer solution is subjected to GPC.

GPC measurement

The measurement is conducted under the following conditions.

(a) Device: 150C-ALC/GPC made by Waters Co.

(b) Column: ZORBAX PSM Bimodal-s made by Du Pont Co.

(c) Amount of the sample: 200 microliters (d) Temperature: 140° C.

(e) Flow rate: 1 ml/min.

The liquid ethylene-type random coplymer of this invention has a number average molecular weight ($\overline{M}_n$), determined by GPC, of $3 \times 10^2$ to $1 \times 10^4$, preferably $5 \times 10^2$ to $5 \times 10^3$. The number average molecular weight is measured by GPC which is calibrated in advance using standard substances of known molecular weights (monodisperse polystyrene and squalane).

Furthermore, the liquid ethylene-type random copolymer of this invention has a B value, defined by the following equation (I), within the range defined by the following equation (II)

$$B \equiv \frac{P_{OE}}{2P_O \cdot P_E} \quad (I)$$

wherein $P_E$ represents the molar fraction of the ethylene component in the copolymer, $P_o$ is the molar fraction of the alpha-olefin component in the copolymer, $P_{OE}$ is the molar fraction of alpha-olefin/ethylene chains in the total dyad chains [these molar fractions in equation (I) are calculated after excluding the terminal components], $$1.05 \leq B \leq 2 \quad (II).$$

The B value is an index showing the state of distribution of the individual monomer components in the copolymer chain, and can be calculated from $P_E$, $P_O$ and $P_{OE}$ which are measured on the basis of G. J. Ray, Macromolecules, 10, 773 (1977, J. C. Randall, Macromolecules, 15, 353 (1982), J. Polymer Science, Polymer Physics Ed., 11, 275 (1973), and K. Kimura, Polymer, 25, 441 (1984).

As the B value is larger, the copolymer has higher alternateness between ethylene and alpha-olefin and a more uniform distribution of ethylene and alpha-olefin and a narrower composition distribution.

Preferably, the liquid ethylene-type random copolymer of this invention has the following B values.

When the copolymer has an ethylene content of not more than 50 mole%:

$1.0+0.3\times P_E \leqq B \leqq 1/(1-P_E)$, more preferably $1.0+0.4\times P_E \leqq B \leqq 1/(1-P_E)$, especially preferably $1.0+0.5\times P_E \leqq B \leqq 1/(1-P_E)$.

When the copolymer has an ethylene content of more than 50 mole%:

$1.3-0.3\times P_E \leqq B \leqq 1/P_E$, more preferably $1.4-0.4\times P_E \leqq B \leqq 1/P_E$, especially preferably $1.5-0.5\times P_E \leqq B \leqq 1/P_E$.

The B value is determined as follows:

A sample is prepared by uniformly dissolving about 200 mg of the copolymer in 1 ml of hexachlorobutadiene in a sample tube having a diameter of 10 mm. The $^{13}$C-NMR spectrum of the sample is usually measured under the following conditions.

Temperature: 120° C.
Frequency: 25.05 MHz
Spectral width: 1500 Hz
Filter width: 1500 Hz
Pulse repeating time: 4.2 sec
Pulse width: 7 usec
Integration cycles: 2000 to 5000

$P_E$, $P_O$ and $P_{OE}$ are determined from the spectrum, and the B value is calculated from these.

In the $^{13}$C-NMR spectrum of the liquid ethylenetype random copolymer of this invention, signals of $\alpha\beta$ and $\beta\gamma$ based on a methylene chain between two adjacent tertiary carbon atoms in the main chain of the copolymer are substantially not observed.

For example, in the following bond of a copolymer of ethylene and 1-hexene, the three central methylene groups are at the positions of $\alpha$, $\beta$, and $\gamma$ from left when viewed from the left tertiary carbon derived from 1-hexene, and on the other hand, at the positions of $\alpha$, $\beta$, and $\gamma$ from right when viewed from the right tertiary carbon. Hence, the above bond unit contains methylene groups which give signals of $\alpha\gamma$ and $\beta\beta$, but contains no methylene group which gives signals of $\alpha\beta$ and $\beta\gamma$.

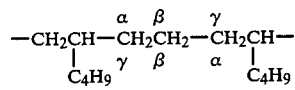

Likewise, in the following bond in which 1-hexenes are bonded by head-to-tail

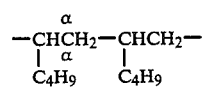

only methylene groups which give signals of $\alpha\alpha$ exist, and there is no methylene group which gives a signal of $\alpha\beta$ and $\beta\gamma$.

On the other hand, the following bonds

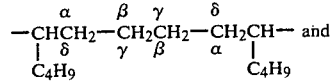

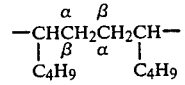

have methylene groups which give a signal of $\beta\gamma$ and a signal of $\alpha\beta$.

The liquid ethylene-alpha-olefin random copolymer of this invention has an iodine value of 0 to 85, preferably 0 to 50. When the iodine value of the liquid ethylene-alpha-olefin random copolymer of the invention is larger than 0, it is a copolymer having a carbon-carbon unsaturated bond based on the ethylene units or alpha-olefin units at one end of the copolymer molecule units, or a mixture of a copolymer having a carbon-carbon unsaturated bond based on the ethylene units or the alpha-olefin units at one end of the copolymer molecule and a copolymer having no carbon-carbon unsaturated bond at one end of the copolymer molecule. When the copolymer has an iodine value of zero, it has no unsaturated bond. For use as a lubricant oil, the liquid ethylene-type random copolymer of this invention conveniently has an iodine value of 0 to 0.3, preferably 0 to 0.2, especially preferably 0 to 0.1.

It is apparent from the foregoing description, in the liquid ethylene-alpha-olefin random copolymer of this invention, the direction of bonding of a monomer copolymerizable with ethylene is regular.

The liquid ethylene-alpha-olefin random copolymer of this invention usually has a viscosity index of 130 to 350, an ignition point of at least 240° C., and a pour point of not more than 0° C.

The liquid ethylene-alpha-olefin random copolymer of this invention has a narrow molecular weight distribution and a composition distribution, and have various excellent properties required of lubricant oils.

When compared with copolymers obtained by using vanadium-type catalysts, the liquid ethylene-alpha-olefin random copolymer of this invention has nearly equal or narrower molecular weight and composition distributions; but it differs in the arrangement of ethylene and alpha-olefin in the main chain of copolymer and is superior in various properties which are considered necessary to lubricant oils.

When the liquid ethylene-alpha-olefin random copolymer of the invention is hydrogenated, there is obtained a hydrogenated polymer having a high viscosity index, a high ignition point, a low pour point, excellent shear stability, excellent oxidation stability, excellent thermal stability and high oil film strength. The hydrogenated polymer is used as a synthetic lubricant oil.

Furthermore, the liquid ethylene-alpha-olefin random copolymer of this invention can be easily modified according to various purposes since it has a double bond capable of reacting with maleic anhydride, etc. at the molecular chain ends.

The following examples specifically illustrate the present invention.

EXAMPLE 1

Preparation of a zirconium catalyst

Toluene (30 ml) and 2 millimoles of bis(cyclopentadienyl)zirconium monochloride monohydride were charged into a 100 ml glass flask thoroughly purged with nitrogen, and formed into a slurry. To the slurry was added dropwise at room temperature 20 millimoes of trimethyl aluminum diluted with toluene (1M solution). After the addition, the mixture was heated to 60° C. and maintained at this temperature for 1 hour. The bis(cyclopentadienyl)zirconium monochloride monohydride dissolved in toluene, and the solution became dark red.

The above reaction was carried out while shutting off light.

Preparation of aluminoxane

A 400 ml glass flask thoroughly purged with argon was charged with 13.9 g of magnesium chloride hexahydrate and 125 ml of toluene. After cooling the materials to 0° C., 250 millimoles of trimethyl aluminum diluted with 125 ml of toluene was added dropwise. After the addition, the temperature was raised to 70° C., and the mixture was maintained at this temperature for 96 hours. After the reaction, the reaction mixture was subjected to solid-liquid separation by filtration. Toluene was removed under reduced pressure from the separated liquid phase to give 7.3 g of aluminoxane as a white solid. The product has a molecular weight, determined from a freezing point depression in benzene, of 1910 and an m value of 31. At the time of polymerization shown below, the aluminoxane was used after again dissolving it in toluene.

Polymerization

A 2-liter continuous polymerization reactor was charged continuously with 1 liter/hr of purified toluene, 5 mg-atom/hr, as aluminum atom, of methylaluminoxane and $8 \times 10^{-2}$ mg-atoms/hr, as zirconium atom, of the zirconium catalyst prepared above. Ethylene and propylene were simultaneously fed continuously into the reactor at a rate of 45 liters/hr and 240 liters/hr, respectively, and polymerized at 40° C. and atmospheric pressure with a residence time of 1 hour under such conditions as to provide a polymer concentration of 65 g/liter. The resulting polymer solution was continuously withdrawn from the reactor, and the polymerization was stopped by adding a small amount of methanol. The polymer solution was washed four times with a large amount of water. Subsequent removal of toluene from the polymer solution gave a colorless transparent liquid polymer. The liquid polymer was dried at 130° C. under reduced pressure (150 mmHg) for 12 hours. The liquid polymer had an ethylene content of 50 mole%, a number average molecular weight ($\overline{M}_n$) of 900, an ($\overline{M}_w/\overline{M}_n$) of 1.71, a B value of 1.30, a kinematic viscosity at 100° C. of 28.1 cst, a viscosity index of 172, an ignition point of 261° C. and an iodine value of 28. Signals based on $\alpha\beta$ and $\beta\gamma$ were not observed in the $^{13}$C-NMR spectrum of the resulting polymer. The activity of the catalyst was 810 g of polymer/mg-atom of Zr.

EXAMPLES 2–9 AND COMPARATIVE EXAMPLES 1–2

Example 1 was repeated except that the conditions indicated in Table 1 were employed. Signals based on $\alpha\beta$ and $\beta\gamma$ were not observed in the $^{13}$C-NMR spectra of the resulting polymers. The results are shown in Table 2.

COMPARATIVE EXAMPLE 3

The same continuous polymerization reactor as used in Example 1 was charged continuously with 2 liters/hr of purified hexane, 48 mg-atom/hr, as aluminum atom, of ethyl aluminum sesquichloride and 8 mg-atom/hr, as vanadium atom, of vanadyl trichloride. Then, ethylene, propylene and hydrogen were simultaneously fed continuously into the reactor at a rate of 30 liters/hr, 30 liters/hr, and 100 liters/hr, respectively, and polymerized at 35° C. under atmospheric pressure with a residence time of 0.5 hour under such conditions as to provide a polymer concentration of 49 g/liter. The reaction mixture was worked up in the same way as in Example 1. The $^{13}$C-NMR spectrum of the resulting liquid polymer showed signals based on $\alpha\beta$ and $\beta\gamma$.

TABLE 1

| | Monomer 1 | | Monomer 2 | | Solvent (l/hr) | Residence time (hr) | Polymerization temperature (°C.) | Zr (mg-atom/hr) | Al (mg-atom/hr) | Polymer concentration (g/l) | Activity (g of polymer/mg-atom of Zr) |
|---|---|---|---|---|---|---|---|---|---|---|---|
| | Type | Amount (l/hr) | Type | Amount (l/hr) | | | | | | | |
| Example 1 | Ethylene | 45 | Propylene | 240 | 1 | 1 | 40 | 0.08 | 5.0 | 65 | 810 |
| 2 | " | 50 | " | " | " | " | " | " | " | 67 | 840 |
| 3 | " | 45 | " | " | " | " | " | 0.02 | " | 75 | 3800 |
| 4 | " | " | " | " | " | " | 80 | 0.04 | 14.0 | 30 | 750 |
| 5 | " | " | " | " | " | " | 40 | 0.004 | 5.0 | 20 | 5000 |
| 6 | " | " | 1-Butene | 250 | " | " | " | 0.08 | " | 57 | 710 |
| 7 | " | 200 | 1-Hexene | 1 | 2 | 0.5 | 60 | 0.16 | 10.0 | 193 | 2400 |
| 8 (*) | " | 45 | propylene | 240 | 1 | 1 | 40 | 0.02 | 5.0 | 32 | 1600 |
| 9 | " | 15 | " | 270 | " | " | " | " | " | 34 | 1700 |
| Comparative Example 1 | " | 5 | " | " | " | " | " | " | " | 19 | 950 |
| 2 (**) | " | 200 | " | 200 | " | " | " | 0.005 | " | 33 | 6600 |
| 3 (***) | " | 30 | " | 30 | 2 | 0.5 | 35 | 8(VOCl$_2$) | 48 | 49 | 12 |

(*) H$_2$ 150 l/hr was fed, () H$_2$ 60 l/hr was fed, and (*) H$_2$ 100 l/hr was fed; hexane was used as a solvent.

TABLE 2

| | α-Olefin | Ethylene content (mole %) | $\overline{M}_n$ | $\overline{M}_w/\overline{M}_n$ | B value | Kinematic viscosity at 100° C. (cst) (1) | Viscosity index (2) | Ignition point (°C.) (3) | Iodine value (4) |
|---|---|---|---|---|---|---|---|---|---|
| Example 1 | Propylene | 50 | 900 | 1.17 | 1.30 | 28.1 | 172 | 261 | 28 |
| 2 | " | 53 | 1050 | 1.82 | 1.29 | 51.5 | 184 | 277 | 24 |
| 3 | " | 43 | 2400 | 1.79 | 1.25 | 423 | 214 | 302 | 11 |
| 4 | " | 63 | 530 | 1.65 | 1.27 | 7.6 | 171 | 242 | 48 |
| 5 | " | 49 | 3700 | 1.74 | 1.30 | 2050 | 320 | 307 | 6.9 |
| 6 | 1-Butene | 55 | 1200 | 1.85 | 1.31 | 104 | 179 | 281 | 21 |
| 7 | 1-Hexene | 59 | 960 | 1.68 | 1.32 | 37.5 | 181 | 266 | .26 |
| 8 | Propylene | 43 | 800 | 1.69 | 1.26 | 21.0 | 169 | 259 | 14 |
| 9 | " | 33 | 730 | 1.71 | 1.25 | 16.1 | 150 | 250 | 34 |
| Comparative Example 1 | " | 6 | 690 | 1.77 | 1.05 | 15.5 | 75 | 241 | 36 |
| 2 (*) | " | 87 | 5600 | 1.82 | 1.14 | — | — | — | 5 |
| 3 | " | 53 | 980 | 2.28 | 1.18 | 47.7 | 164 | 260 | <0.1 |

(1) Measured in accordance with JIS K-2283
(2) Measured in accordance with JIS K-2283
(3) Measured in accordance with JIS K-2265
(4) Measured in accordance with JIS K-3342
(*) Waxy at room temperature

EXAMPLE 10

Preparation of aluminoxane

Toluene (125 ml) and 37 g of $Al_2(SO_4)_3 \cdot 14H_2O$ were charged into a 400 ml flask fully purged with argon, and formed into a slurry. To the slurry was added dropwise at 0° to −5° C., 0.5 mole of trimethyl aluminum diluted with 125 ml of toluene. After the addition, the temperature was raised to 40° C., and the mixture was maintained at this temperature for 30 hours. Subsequently, the reaction mixture was subjected to solid-liquid separation by filtration. Toluene was removed from the separated liquid phase to obtain 15.2 g of aluminoxane as a white solid. The product had a molecular weight, determined from a freezing point depression in benzene, of 1600, and a m value of 26. For polymerization shown below, aluminoxane was used after again dissolving it in toluene.

Polymerization

A 1-liter continuous polymerization reactor was charged continuously with 500 ml/hr of purified toluene, 5.0 mg-atom/hr, as aluminum atom, of aluminoxane, and $5 \times 10^{-3}$ mg-atom/hr, as zirconium atom, of bis(cyclopentadienyl)zirconium dichloride dissolved in toluene. Then, ethylene and propylene were simultaneously fed continuously into the reactor at a rate of 60 liters/hr and 140 liters/hr, respectively, and polymerized at 45° C. under atmospheric pressure with a residence time of 1 hour under such conditions as to provide a polymer concentration of 71 g/liter. Water was added to the resulting polymer solution and deashing was carried out. Toluene was removed, and the residue was dried at 120° C. under reduced pressure for 12 hours. The polymerization activity of the catalyst was 7100 g of polymer/mg-atom of Zr. The product was a liquid tacky polymer having an ethylene content of 62 mole%, an $\overline{M}_n$ of 2800, a B value of 1.27, an iodine value of 9.1, an intrinsic viscosity of 0.19 dl/g and an $\overline{M}_w/\overline{N}_n$ of 1.73. Signals based on $\alpha\beta$ and $\beta\gamma$ were not observed in the $^{13}$C-NMR spectrum of the resulting polymer.

EXAMPLE 11

Example 10 was repeated except that ethylene and propylene were continuously fed into the reactor at a rate of 40 liters/hr and 160 liters/hr, respectively, and polymerized under such conditions as to provide a polymer concentration of 37 g/liter. The polymerization activity of the catalyst was 3700 g of polymer/mg-atom of Zr. There was obtained a tacky liquid polymer having an ethylene content of 55 mole%, an intrinsic viscosity of 0.12 dl/g, an $\overline{M}_n$ of 2000, an $\overline{M}_w/\overline{M}_n$ of 1.60, a B value of 1.28 and an ioidine value of 13. Signals based on $\alpha\beta$ and $\beta\gamma$ were not observed in the $^{13}$C-NMR spectrum of the resulting polymer.

EXAMPLE 12

Example 10 was repeated except that ethylene and propylene were continuously fed into the reactor at a rate of 30 liters/hr and 170 liters/hr, respectively, and $1 \times 10^2$ mg-atom/hr, as zirconium atom, of bis(cyclopentadienyl)zirconium dichloride dissolved in toluene and polymerized under such conditions as to provide a polymer concentration of 48 g/liter. The polymerization activity of the catalyst was 2400 g of polymer/mg-atom of Zr. There was obtained a tacky liquid polymer having an ethylene content of 51 mole%, an intrinsic viscosity of 0.08 dl/g, an $\overline{M}_n$ of 1500, an $\overline{M}_w/\overline{M}_n$ of 1.53, a B value of 1.28 and an ioidine value of 17. Signals based on $\alpha\beta$ and $\beta\gamma$ were not observed in the $^{13}$C-NMR spectrum of the resulting polymer.

EXAMPLE 13

Example 12 was repeated except that ethylene and propylene were continuously fed into the reactor at a rate of 40 liters/hr and 160 liters/hr, respectively, and polymerized at 70° C. under such conditions as to provide a polymer concentration of 24 g/liter. The polymerization activity of the catalyst was 1200 g of polymer/mg-atom of Zr. There was obtained a liquid polymer having an ethylene content of 65 mole%, an $\overline{M}_n$ of 1300, an $\overline{M}_w/\overline{M}_n$ of 1.59, a B value of 1.26, an iodine value of 19, and an intrinsic viscosity of 0.07 dl/g. Signals based on αβ and βγ were not observed in the $^{13}$C-NMR spectrum of the polymer.

EXAMPLE 14

Example 12 was repeated except that ethylene and 1-butene were continuously fed at a rate of 40 liters/hr and 160 liters/hr, respectively, at 60° C. under such conditions as to provide a polymer concentration of 44 g/liter. The polymerization activity of the catalyst was 2200 g of polymer/mg-atom of Zr. There was obtained a tacky liquid polymer having an ethylene content of 60 mole%, an $\overline{M}_n$ of 2300, an $\overline{M}_w/\overline{M}_n$ of 1.82, a B value of 1.30, an iodine value of 11, and an intrinsic viscosity of 0.14 dl/g. Signals based on αβ and βγ were not observed in the $^{13}$C-NMR spectrum of the polymer.

EXAMPLE 15

A 2-liter SUS stainless steel autoclave fully purged with nitrogen was charged with 500 ml of purified toluene and 500 ml of propylene at 20° C. Subsequently, 10 mg-atom, as aluminum atom of the aluminoxane synthesized in Example 10, and 0.015 mg-atom, as zirconium atom of bis(cyclopentadienyl)zirconium dichloride dissolved in toluene were introduced under pressure together with ethylene. The monomers were then polymerized at 30° C. for 2 hours under a partial ethylene pressure of 0.5 kg/cm$^2$. The polymerization was stopped by adding a small amount of ethanol, and then the unreacted propylene and ethylene were purged. The polymer was obtained as a solution in toluene. Hydrochloric acid was added to the polymer solution, and the catalyst residue was removed. The solution was washed with water, and toluene was removed. The residue was then dried to give a liquid polymer having an ethylene content of 41 mole%, an $\overline{M}_n$ of 1600, an $\overline{M}_w/\overline{M}_n$ of 1.96, a B value of 1.28, an iodine value of 16, and an intrinsic viscosity of 0.09 dl/g. The polymerization activity of the catalyst was 7500 g of polymer/mg-atom of Zr. Signals based on αβ and βγ were not observed in the $^{13}$C-NMR spectrum of the polymer.

EXAMPLE 16

Preparation of alumoxane

Aluminoxane was synthesized in the same way as in Example 10 except that 39 g of Al$_2$(SO$_4$)$_3$.14H$_2$O was used and reacted at 40° C. for 6 days. The resulting aluminoxane had a molecular weight, determined from a freezing point depression in benzene, of 2800 and a m value of 46.

Polymerization

The same polymerization as in Example 12 was repeated except that the polymerization was carried out under such conditions as to provide a polymer concentration of 59 g/liter. The polymerization activity of the catalyst was 3000 g of polymer/mg-atom of Zr. There was obtained a liquid polymer having an ethylene content of 49 mole%, an $\overline{M}_n$ of 1400, an $\overline{M}_w/\overline{M}_n$ of 1.50, a B value of 1.29, an iodine value of 18 and an intrinsic viscosity of 0.08 dl/g. Signals based on αβ and βγ were not observed in the $^{13}$C-NMR spectrum of the polymer.

APPLICATION EXAMPLE 1

A 2-liter stainless steel autoclave was charged with 1 liter of cyclohexane, 100 g of the liquid polymer obtained in Example 1 and 4 g of a nickel catalyst (N-103, a product of Nikki Chemical Co.), and the polymer was hydrogenated at 150° C. for 3 hours under a hydrogen pressure of 25 kg/cm$^2$-G. After the reaction, cyclohexane was removed, and the product was dried at 130° C. under reduced pressure (150 mmHg) for 12 hours. The resulting liquid polymer had a kinematic viscosity at 100° C. of 28.8 cst, a viscosity index of 171, an ignition point of 264° C., a pour point of −37.5° C., a load carrying capacity of 7.5 kg/cm$^2$ and an iodine value of less than 0.1.

APPLICATION EXAMPLES 2-4

The liquid polymers obtained in Examples 2 to 7 were respectively hydrogenated in the same way as in Application Example 1. The results are shown in Table 3.

TABLE 3

| Application Example | Polymer used (by Examples) | Kinematic viscosity at 100° C. (cst) (1) | Viscosity index (2) | Ignition point (°C.) (3) | Pour point (°C.) (4) | Load carrying capacity (kg/cm$^2$) (5) | Iodine value (6) |
|---|---|---|---|---|---|---|---|
| 1 | 1 | 28.8 | 171 | 264 | −37.5 | 7.5 | <0.1 |
| 2 | 2 | 50.2 | 182 | 281 | −35.0 | 8.0 | " |
| 3 | 3 | 420 | 214 | 305 | −10.0 | — | " |
| 4 | 4 | 7.5 | 172 | 247 | −55.0 | 5.5 | " |
| 5 | 5 | 2090 | 318 | 310 | 0 | — | " |
| 6 | 6 | 100 | 177 | 285 | −32.5 | 8.0 | " |
| 7 | 7 | 38.1 | 181 | 271 | −37.5 | 8.0 | " |

The above properties were measured in accordance with the following test methods.
(1) JIS K-2283
(2) JIS K-2283
(3) JIS K-2265
(4) JIS K-2269
(5) JIS K-2519
(6) JIS K-3342

EXAMPLES 17-18

Ethylene and propylene were copolymerized in the same way as in Example 1 except that instead of the zirconium catalyst used together with aluminoxane, bis(cyclopentadienyl)hafnium dichloride (Example 17) or bis(cyclopentadienyl)titaniunm dichloride (Example 18) was used.

The polymerization conditions and the results are shown in Table 4.

TABLE 4

| Example | | | 17 | 18 |
|---|---|---|---|---|
| Monomer 1 | Type | | Ethylene | Ethylene |
| | Amount (l/hr) | | 45 | 45 |
| Monomer 2 | Type | | Propylene | Propylene |
| | Amount (l/hr) | | 240 | 240 |
| Solvent (l/hr) | | | 1 | 1 |
| Residence time (hr) | | | 1 | 1 |
| Polymerization temperature (°C.) | | | 40 | 40 |
| Cata-lyst | Tran-sition metal | Type | Hf | Ti |
| | | Amount (mg-atom/hr) | 0.20 | 0.50 |
| | Al (mg-atom/hr) | | 5.0 | 2.0 |
| Polymer concentration (g/l) | | | 16 | 8 |
| Activity (g of polymer/mg-atom of metal) | | | 80 | 16 |
| Ethylene conent (mole %) | | | 54 | 47 |
| $\overline{M}_n$ | | | 810 | 730 |
| $\overline{M}_w/\overline{M}_n$ | | | 2.05 | 2.34 |
| B value | | | 1.24 | 1.22 |
| Kinematic viscosity at 100° C. (cst) | | | 23.2 | 15.5 |
| Viscosity index | | | 165 | 159 |
| Ignition point (°C.) | | | 260 | 258 |
| Iodine value | | | 31 | 35 |

What is claimed is:

1. A liquid ethylene-alpha-olefin random copolymer consisting essentially of units derived from ethylene and an alpha-olefin having 3 to 20 carbon atoms, said copolymer being characterized in that
    (a) it has an ethylene unit content in the range of 10 to 85 mole% and an alpha-olefin unit content in the range of 15 to 90 mole%,
    (b) it has a number average molecular weight ($\overline{M}_n$), measured by gel permeation chromatography, of $3 \times 10^2$ to $1 \times 10^4$,
    (c) it has a molecular weight distribution ($\overline{M}_w/\overline{M}_n$), determined by gel permeation chromatography, of not more than 2.5,
    (d) it has a B value, defined by the following equation (I), within the range defined by the following equation (II)

$$B = \frac{P_{OE}}{2P_O \cdot P_E} \quad (I)$$

wherein $P_E$ represents the molar fraction of the ethylene component in the copolymer, $P_O$ is the molar fraction of the alpha-olefin component in the copolymer, $P_{OE}$ is the molar fraction of alpha-olefin/ethylene chains in the total dyad chains, $$1.05 \leq B \leq 2 \quad (II),$$

(e) signals of $\alpha\beta$ and $\beta\gamma$ based on a methylene chain between two adjacent tertiary carbon atoms in the main chain of the copolymer are not observed in the $^{13}$C-NMR spectrum of the copolymer, and
   (f) it has an iodine value in the range of 0 to 85.

2. The copolymer of claim 1 which has an ethylene unit content of 20 to 80 mole% and an alpha-olefin unit content of 20 to 80 mole%.

3. The copolymer of claim 1 which has an ethylene unit content of 30 to 70 mole% and an alpha-olefin unit content of 30 to 70 mole%.

4. The copolymer of claim 1 which has a number average molecular weight of $5 \times 10^2$ to $5 \times 10^3$.

5. The copolymer of claim 1 which has a molecular weight distribution of not more than 2.2.

6. The copolymer of claim 1 which has an ethylene unit content of not more than 50 mole% and a B value defined by the formula $$1.0 + 0.3 \times P_E \leq B \leq 1/(1 - P_E).$$

7. The copolymer of claim 1 which has an ethylene content of more than 50 mole% and a B value defined by the equation $$1.3 - 0.3 \times P_E \leq B \leq 1/P_E.$$

8. The copolymer of claim 1 which has an iodine value in the range of 0 to 50.

9. A synthetic lubricant oil composed of the liquid ethylene-alpha-olefin random copolymer of claim 1.

10. The synthetic lubricant oil of claim 9 wherein the liquid ethylene-alpha-olefin type random copolymer has an iodine value of 0 to 0.3.

11. The synthetic lubricant oil of claim 9 wherein the liquid ethylene-alpha-olefin random copolymer is a hydrogenated product of the liquid ethylene-alpha-olefin random copolymer having an iodine value of not more than 80 and the hydrogenated copolymer has an iodine value of 0 to 0.3.

* * * * *